United States Patent Office 3,211,001
Patented Oct. 12, 1965

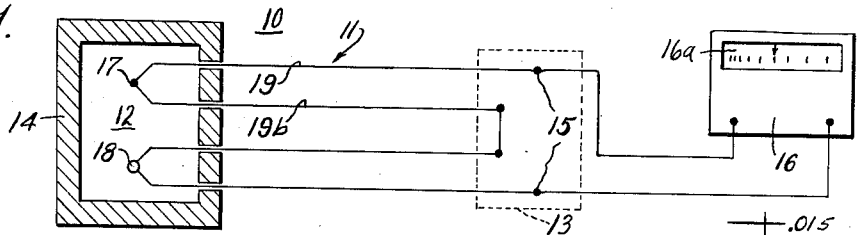
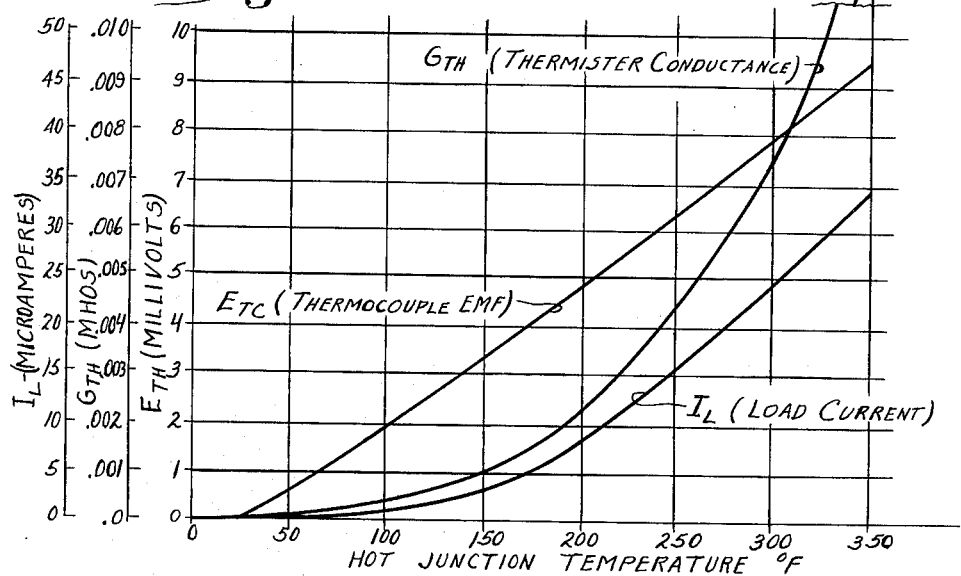
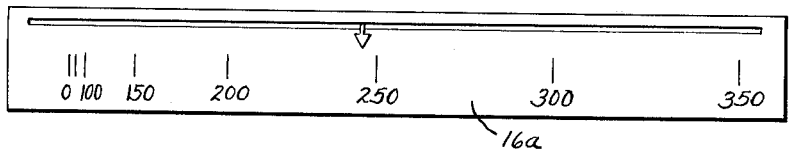
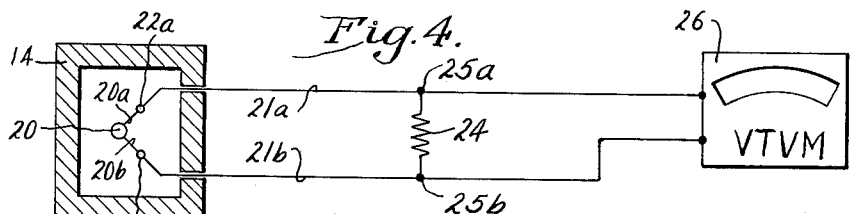
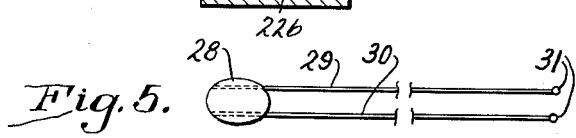

3,211,001
TEMPERATURE SENSING DEVICE
Glenn A. Pettit, Rockford, Ill., assignor to Barber-Colman Company, Rockford, Ill., a corporation of Illinois
Filed Aug. 1, 1961, Ser. No. 128,428
3 Claims. (Cl. 73—359)

The application relates to thermocouple circuits and particularly to thermocouple thermometers.

Thermocouple thermometers are often employed for temperature indication and control functions. Such devices are connected as an electrical circuit with one thermocouple measuring or "hot" junction exposed to a temperature to be measured and another reference or "cold" junction at a known temperature for generating a voltage which is transmitted to a conveniently located indicating instrument or other signal responsive device. Improved sensitivity has customarily been sought for any given type of thermocouple by provision of more highly sensitive indicating instruments. Such sensitivity has usually been accomplished by greater cost and fragility or by suppression of part of the usually indicated temperature range.

It is the primary object of the present invention to provide a thermocouple circuit having a higher current change per degree sensitivity than heretofore available in temperature sensing circuits without using an external power source. Moreover, it is particularly an object to electrically magnify the temperature indications in the upper portion of the range of temperature difference encountered between the measured zone and the reference zone, this upper range portion being in many instances the most important factor in the specification of thermocouples for a particular installation. It is also an object to provide an improved high sensitivity thermocouple thermometer of economical and simple construction. A still further object of the invention is to provide such a thermocouple thermometer in which the low range indication is condensed, while still retaining the thermocouple zero reference indication.

Other objects and advantages of the invention will become apparent upon reading the following detailed description and upon reference to the drawings in which:

FIGURE 1 is a schematic diagram of a temperature sensing device embodying the invention;

FIG. 2 is a plot of thermistor conductivity thermocouple voltage, and load current against temperature over a typical thermometer range;

FIG. 3 illustrates a temperature scale calibration for a linear response instrument incorporated in the FIGURE 1 apparatus;

FIG. 4 is a representation of a modification of the sensing device of FIG. 1; and FIG. 5 is a representation of an integral thermocouple-thermistor combination.

While the invention will be described in connection with a preferred embodiment it will be understood that I do not intend to limit the invention to such embodiment, but, on the contrary, it is intended to cover all alternatives, such as potential devices measuring voltage across a fixed load resistance, with modifications and equivalents falling within the spirit and scope of the invention as defined by the appended claims.

Turning first to FIG. 1, a thermocouple thermometer or pyrometer 10 is generally shown having incorporated therein a thermocouple temperature difference sensing circuit 11 for providing an electrical output signal responsive and related in magnitude to the difference in temperature between a measured zone 12 and a reference zone 13. As shown in the preferred embodiment of FIG. 1, the measured zone 12 is defined by a furnace enclosure 14 while the reference zone 13 is chosen to be outside this furnace enclosure 14. The temperature of the measured zone 12 is customarily elevated above the temperature of the reference zone 13, which latter may be the ambient room temperature or a more precisely maintained reference temperature.

The output voltage signal produced across output terminals 15 of the sensing circuit 11 is applied to a relatively low resistance load 16, suitably a conventional direct-current microammeter or galvanometer of the well-known D'Arsonval type which acts as a resistance load across the terminals. The load device may suitably also be a high-resistance amplifier, pyrometer recorder, or like device provided it is shunted by a resistor of relatively low value. The device 16 of the preferred embodiment normally has a linear angular movement in which a pointer or other indicator element moves a unit amount with each unit change in voltage across the instrument terminals (which is also the unit change in current through the instrument). The instrument may include bimetallic or other compensators as is well-known in thermocouple thermometers to relate an ambient cold reference temperature to a zero or other reference temperature on the instrument scale.

The instrument scale 16A is preferably marked in degrees of temperature as shown in FIG. 3, the effective instrument scale zero being the reference or cold junction temperature. The scale is advantageously calibrated to reflect the magnification of an upper portion of the temperature scale range in accordance with the electrical magnification caused by the sensing circuit about to be described.

As further shown in FIG. 1, and in accordance with the invention, the sensing circuit 11 employs in series, a thermocouple junction 17, and a thermistor or thermal resistor 18, both being located in the measured or hot zone 12 so as to be heated to the temperature to be sensed.

The temperature junction in this instance is formed of the fused or otherwise conductively joined ends of iron and constantan wires 19 and 19b respectively. This combination of dissimilar metals is frequently employed for measuring temperatures up to a few hundred degrees. FIG. 2 includes a plot of voltage against temperature as produced by the exemplary thermocouple for a 32° F. to 350° F. range, the reference or cold zone temperature being maintained at 32° F. For most practical purposes, the 0° F. current is undistinguishable from the 32° F. current and no attempt has been made to distinguish these points on the FIG. 3 scale.

The thermistor or thermal resistor element 18 is a resistance element having a high negative temperature coefficient. That is, its resistance decreases rapidly in an exponential function as its absolute temperature increases. Conversely, its conductance increases rapidly with temperature. For purposes of facilitating the illustration of current variation in the sensing circuit, the conductance instead of resistance of the thermistor is plotted against temperature difference in FIG. 2.

Such thermistors are commonly made by sintering mixtures of metallic oxides such as manganese, nickel, cobalt, copper, iron and uranium. These materials also have a high resistivity at normal room temperatures so as to be classed as semi-conductors. While physically such devices may take different forms, a suitable form for instrumentation purposes here described is a bead thermistor made by fusing small ellipsoids of thermistor material on the ends of a pair of spaced-apart small diameter wires which serve as leads or electrodes. The usual bead has a small diameter (for example, in the order of 1/16 of an inch) and may be glass-coated or sealed into a bulb or probe for protection. Its small size and mass are of the same order of magnitude as a thermocouple junction, thus facilitating the placement of both at adjacent locations in the measured or hot zone to sense the same temperature without themselves appreciably lowering the zone temperature.

Because the resistance load across the sensing circuit has a relatively low resistance, current flow through the circuit is appreciably raised by the change in thermistor resistance as well as by the change in generated thermocouple voltage. Both elements cause an increase in current flow with temperature with the result that the change in current per degree in the upper part of the temperature range is at a higher rate than in a thermometer circuit relying upon either thermocouples or thermistors alone. The plot of load current against temperature in FIG. 2 illustrates this effect. As graphically portrayed in FIG. 3, the scale calibration of a linear response instrument spreads out the 250° to 350° range to more than half the linear range of the 0° to 350° F. scale, thus providing a very useful electrical magnification or sensitivity increase. Conversely, the low temperature portion of the instrument scale is condensed and nearly completely suppressed. It will be appreciated that the sensing circuit current change may also be measured by suppressed range galvanometers in which a substantial initial torque of the restraining springs of the instrument armature mechanically suppresses armature response to currents below a given level. For a given instrument the combined electrical and mechanical suppression provide an even greater scale magnification in a high scale range than by mechanical suppression alone.

So long as the essentially current-varying rather than voltage-varying characteristics of the temperature sensing circuit are recognized, various current responsive load devices, whether metering instruments or control devices, may be profitably employed with the sensing circuit.

The current curve in FIG. 2 is a reflection of Ohm's law in which $$I_L = \frac{E_{TC}}{R_{TH} + R_L}$$

where $R_{TH}$ is the resistance of the thermistor at the temperature being measured and $R_L$ is the essentially constant resistance of the load device. For example, in an embodiment corresponding to the FIGURE 1 circuit and analyzed in FIGURE 2, the instrument resistance was essentially constant in the vicinity of 200 ohms (i.e., its conductance was .005 mhos) whereas the thermistor resistance varied from 26.5 megohms at 0° F. (i.e., from a conductance near zero as shown in FIG. 2) down to 70 ohms at 350° F. (i.e., to a conductance near .015 mhos as shown in FIG. 2). $R_{TH}$ at the zero or low temperature end of the scale is thus very many times or orders of magnitude greater than $R_L$ but is of the same order of magnitude as $R_L$ or even smaller than $R_L$ in the expanded upper temperature range.

Although the preferred embodiment discloses one thermocouple in series with the thermistor, it is within the teachings of the present invention to provide additional series connected thermocouples. Such a sensing circuit operates in the same manner as the single thermocouple circuit, except that the series connection of thermocouples or thermopile provides a larger generated voltage.

The thermocouple measuring junction and the thermistor element may be placed directly in series without employing extension wires for making the series connection in the reference or "cold" junction zone. The thermocouple hot junction may even be divided as shown in FIG. 4 in which a bead-like thermistor element 20 having short wire terminals 20a and 20b is positioned in the furnace 14 or otherwise exposed to a temperature to be measured. The terminals 20a and 20b are of the same metal. The iron and constantan wires 21a and 21b of the thermocouple (other known pairs of dissimilar metals may be substituted as desired) are respectively fused or otherwise connected to the thermistor terminal wires 20a or 20b to form junctions 22a and 22b. These junctions are in close proximity to the thermistor and are likewise located exposed to the temperature to be measured. While there is no direct iron to constantan junction, the effect is the same as long as the junction of the thermistor terminal wires with the thermistor bead are at the same temperature as the iron and constantan junctions. Hence an iron to constantan junction and the thermistor may be regarded as series connected.

By way of further illustration of the operation of various types of load means in the circuit of FIG. 4, a resistor 24 is shown connected between the ends of the iron and constantan wires 21a and 21b at terminals 25a and 25b, which are exposed to reference temperature. The resistor 24 has a relatively low value compared to the resistance of the thermistor 20 so that current flow through resistor 24 increases with the increase in thermistor conductance as well as the increase in thermocouple voltage or e.m.f. when the furnace temperature increases. A measuring instrument 26 having a practically infinite input resistance, such as a vacuum tube voltmeter (indicated as VTVM in FIG. 4) is connected across all or part of the resistor 24. With such a connection the thermistor 20 and resistor 24 may be considered as a voltage dividing network in which the resistor 24 is the constant resistance and the thermistor 20 is the variable resistance. It will be appreciated, however, that the basic measurement is essentially one of current flow through the closed circuit comprising the series thermistor, thermocouple, and resistance load with such a circuit as shown in FIG. 4, since the measure of the voltage drop across resistor 24 is also the measure of the current flow through it. Again by making the value of resistance 24 relatively low, the range of voltage readings on instrument 26 for a given temperature change is maximized.

An integral thermistor-thermocouple junction series combination may also be constructed in the manner shown in FIG. 5. In this construction a bead 28 of thermistor material is fused on the spaced ends of pair of wires 29 and 30 of dissimilar metals, such as iron and constantan. The thermistor material is preferably a mixture of metallic oxides as previously described. To partially relieve stresses arising from differential thermal expansion of the wires and thermistor bead, the ends of each wire may be first coated with a metal alloy selected for expansion characteristics intermediate those of the wire and the bead material. With the unitary construction it will be appreciated that the "hot" junction conductors are separated by the thermistor material but are effective by series with the thermal resistor. The iron and constantan conductors are extended to the reference or "cold" junction terminals 31 as is customary.

While variations of the connections have been discussed above, it will be appreciated that the basic circuit is one in which the relatively low load resistance may be that of or in shunt with various types of indicating or control devices. In all cases, the generated voltage of the thermocouple is itself self-employed without resort to an external battery or other source.

I claim:

1. An expanded upper range thermocouple thermometer for measuring current values indicative of temperature comprising a thermocouple, a thermistor, and a low-resistance galvanometer having an angularly rotatable movement linearly responsive to galvanometer current connected serially in a closed circuit, and means for locating both the thermistor and the measuring junction of the thermocouple in the temperature zone to be measured, said thermistor having a resistance very many times higher than that of the galvanometer in the lower range of the thermometer to permit only small thermocouple currents to flow through the galvanometer when the zone temperature is in said lower range and having a resistance of the same order of magnitude or smaller than that of the galvanometer when the zone temperature is in said upper range to thereby expand the temperature sensitivity of the thermometer in said upper range.

2. An expanded upper range thermocouple thermometer comprising a thermocouple, a thermistor, and a resistor connected serially in a closed circuit, means for locating both the thermistor and the measuring junction of the thermocouple in the temperature zone to be measured, and indicating means responsive to voltage drop across the resistor as a measure of the temperature of said zone, said resistor having a resistance value which is low compared to that of the thermistor at zone temperatures below the desired upper range and for a resistance value which is of the same order of magnitude or higher than that of the thermistor at the zone temperatures in said upper range whereby a much higher indicating response per temperature increment is obtained in the upper range only of the thermometer.

3. A temperature measuring circuit comprising a hot thermocouple junction, a cold thermocouple junction, a thermal resistor having a high temperature coefficient of resistance, and a resistance load connected in series, said load incorporating an instrument having a temperature indicating scale, the thermal resistor and one of said junctions together adapted to be subjected to a temperature to be measured, the other of said junctions being adapted to be subjected to a reference temperature zone, said thermal resistor having a very high resistance with respect to the resistance of said load at the end of the temperature scale corresponding to the temperature of said other of said junctions and having a resistance of the same order of magnitude or lower than the resistance of said load at the other end of the temperature scale whereby a larger scale indication per measured temperature increment is obtained at said other end of the scale.

References Cited by the Examiner

UNITED STATES PATENTS

| 2,612,779 | 10/52 | Mulford | 73—359 |
| 2,696,118 | 12/54 | Petry | 73—359 |
| 2,769,340 | 11/56 | Bernreuter et al. | 73—361 |
| 2,914,594 | 11/59 | Kanne | 136—4 |
| 3,001,126 | 9/61 | Fritts et al. | 323—69 |
| 3,026,363 | 3/62 | Batteau | 136—4 |
| 3,064,222 | 11/62 | Renier | 73—362 |
| 3,101,617 | 8/63 | Brinson | 73—341 |

FOREIGN PATENTS 768,120  2/57  Great Britain.

ISSAC LISANN, *Primary Examiner.*